March 20, 1945.	J. M. RADABAUGH	2,371,649
ELECTRODE HOLDER
Filed June 22, 1943	2 Sheets-Sheet 1
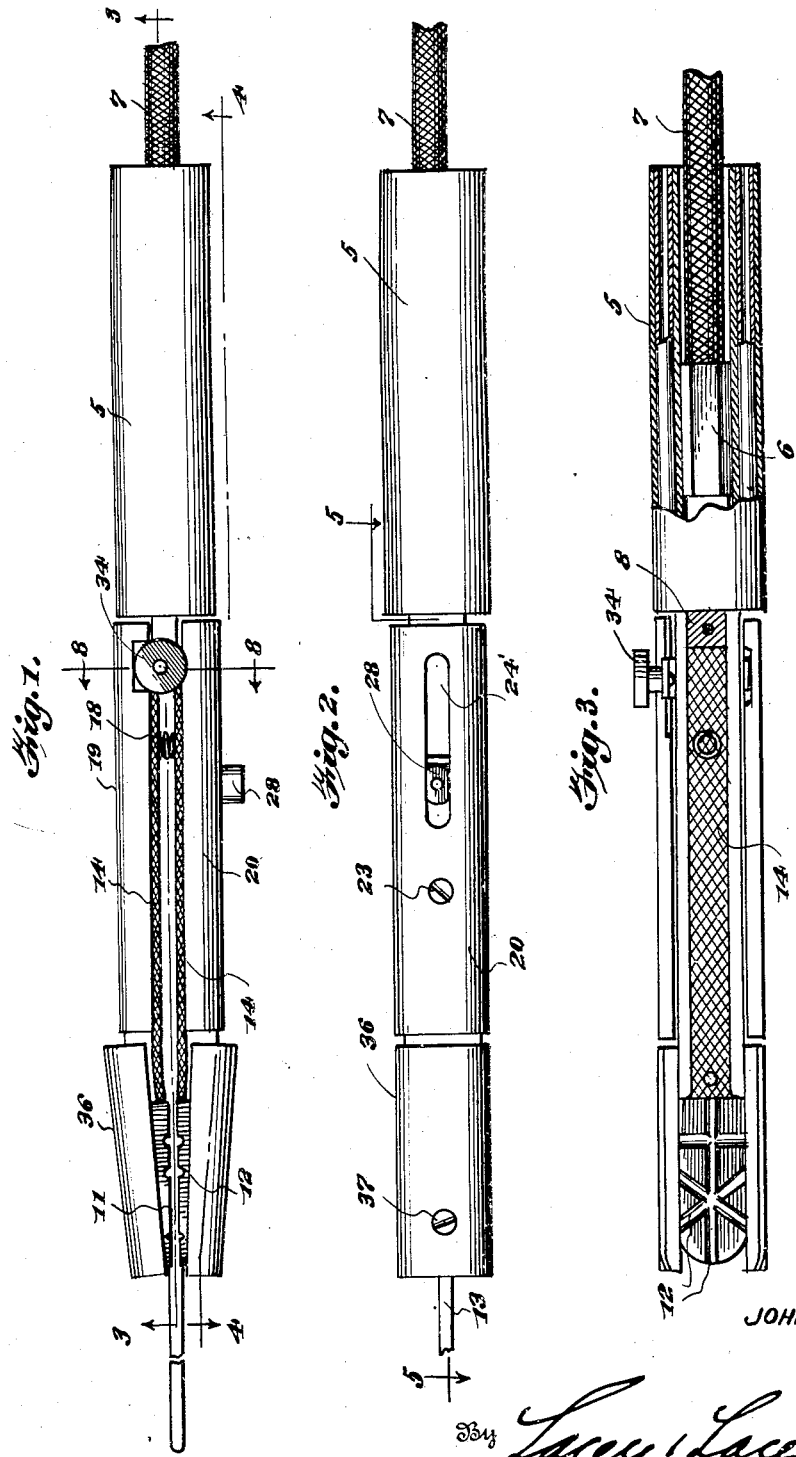
Inventor
JOHN M. RADABAUGH
By Lacey & Lacey
Attorneys

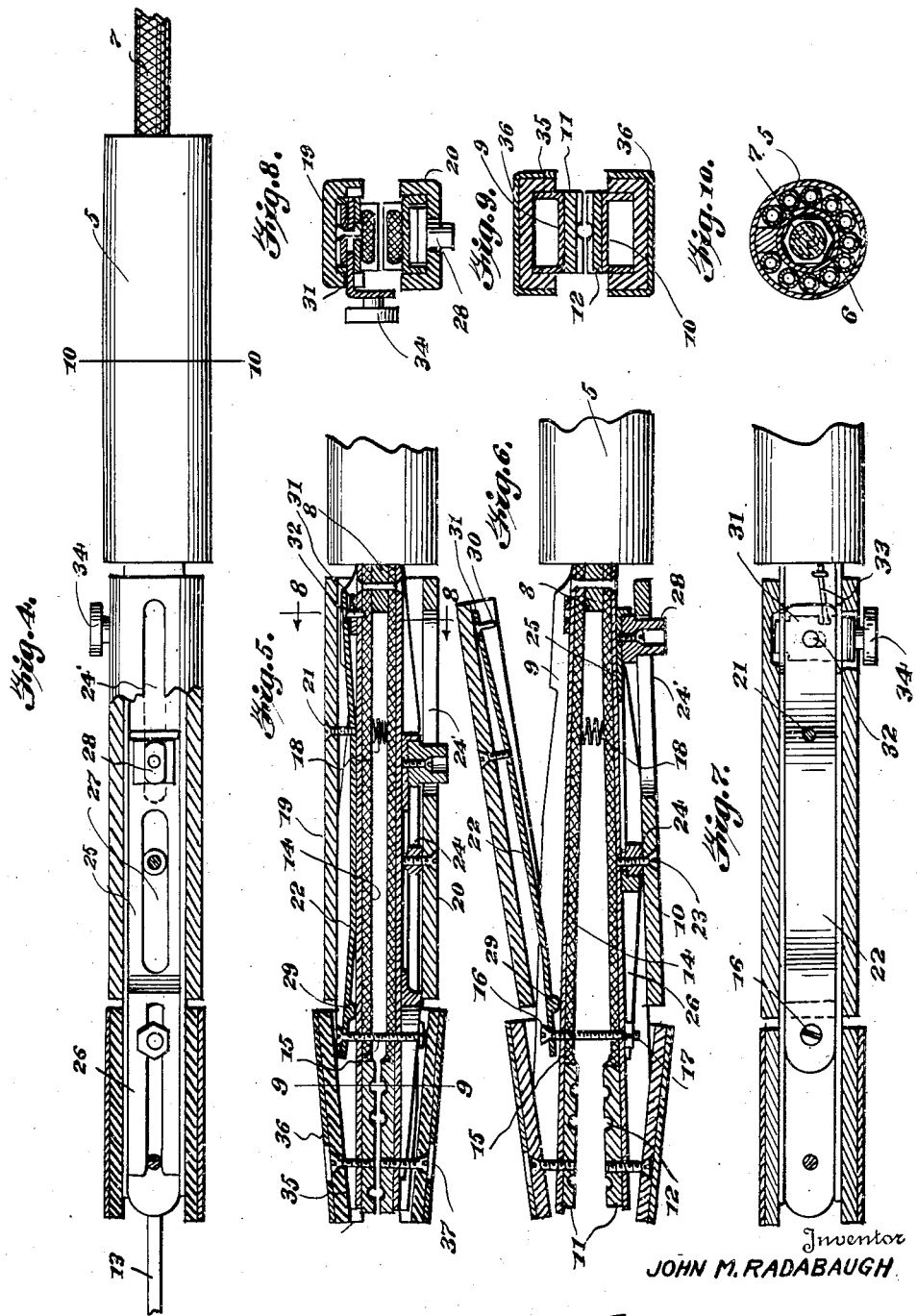

Patented Mar. 20, 1945

2,371,649

UNITED STATES PATENT OFFICE 2,371,649

ELECTRODE HOLDER

John M. Radabaugh, Mount Vernon, Ohio

Application June 22, 1943, Serial No. 491,817

8 Claims. (Cl. 219—8)

This invention relates to electrode holders for electric arc welding and more particularly to a holder of the clamping jaw type.

The object of the invention is to provide an electrode holder, the construction of which is such that the work engaging ends of the jaws may be adjusted laterally toward or away from each other to clamp welding rods of different cross sectional diameters and, after the desired adjustment has been effected, one of said jaws may be released to permit the removal of the welding rod or the insertion of another rod.

A further object of the invention is to provide an electrode holder including a supporting handle having yieldably supported channel-shaped jaws operatively associated therewith and connected at their outer ends by a transverse pin, means being mounted in the channel of one of the jaws and cooperating with one end of said pin for effecting lateral adjustment of the jaw, and means carried by the other jaw and coacting with the other end of said pin for releasing the jaws from engagement with the welding rod.

A further object is to provide the work-engaging end of each clamping jaw with a protecting guard or shield which prevents the flame from coming in direct contact with the insulation and destroying the same.

A still further object of the invention is generally to improve this class of devices so as to increase their utility, durability and efficiency.

In the accompanying drawings:

Figure 1 is a side elevation of an electrode holder embodying the present invention.

Figure 2 is a plan view.

Figure 3 is a longitudinal sectional view taken on the line 3—3 of Fig. 1.

Figure 4 is a plan view with the adjacent side plate broken away to show the construction of the jaw adjusting mechanism.

Figure 5 is a longitudinal sectional view taken on the line 5—5 of Fig. 2, and showing the jaws in clamping position.

Figure 6 is a similar view showing the jaws separated to permit the insertion or removal of a welding rod.

Figure 7 is a plan view with the adjacent side plate in cross section and showing the construction of the push button and its associated parts for releasing the jaws.

Figure 8 is a transverse sectional view taken on the line 8—8 of Fig. 5.

Figure 9 is a similar view taken on the line 9—9 of Fig. 5.

Figure 10 is a transverse sectional view taken on the line 10—10 of Figure 4.

The improved electrode holder forming the subject matter of the present invention comprises a cylindrical supporting handle 5 formed of insulating material and preferably of hollow construction to keep same cool under working conditions. Disposed within the handle 5 is a metallic socket 6 in which is fitted an electric cable 7, said socket being provided with a flat extension 8 preferably projecting a short distance beyond the forward end of the handle, as shown. Riveted or otherwise secured to the flat extension 8 are coacting yieldable upper and lower jaws 9 and 10 preferably channel-shaped in cross section, as indicated in Fig. 9, and having their outer or free ends provided with work-engaging members 11 formed with a series of longitudinal and transverse grooves 12 adapted to receive and support a welding rod, indicated at 13.

Secured to the work-engaging members 11 and extending longitudinally of the confronting faces of the jaws 9 and 10, are conductors 14, said conductors having their rear ends electrically connected with the extension 8 of the socket member 6. Loosely fitted in the outer ends of the jaws 9 and 10 is a transverse connecting pin 15 having an enlarged head 16 at one end thereof and a nut 17 at its other end. The jaws 9 and 10 are normally disposed at a slight angle to each other and interposed between said jaws is a coil spring 18 for normally maintaining the working ends of the jaws separated. The jaws 9 and 10 are provided with detachable side plates 19 and 20, the side plate 19 being secured by a bolt 21 to a cam actuating member 22 and the side plate 20 being secured to the jaw 10 by a screw 23 extending through a spacing stud 24.

As a means for adjusting the working ends of the jaws toward and away from each other to accommodate welding rods of different cross sectional diameters, there is provided a sliding bar 25 mounted for longitudinal movement between the side flanges of the channel iron constituting said jaw and having its outer end slotted to form downwardly inclined fingers 26 adapted to extend beneath the nut 17 of the connecting pin 15 and force the working end of the jaw 10 toward the working end of the jaw 9. The intermediate portion of the sliding bar 12 is provided with a slot 27 which receives the stud 24 and extending laterally from the rear end of the bar 25 and projecting through a slot 24' in the adjacent side plate 20 is a finger piece or knob 28 by means of which the sliding bar may be moved longitudinally to effect adjustment of the jaw.

The forward end of the actuating member 22 is provided with a cam 29 and a terminal opening which receives the head 16 of the transverse pin 15, so that when downward pressure is exerted on the side plate 19, the cam 29, by engagement with the channel iron constituting the upper jaw 9, will press the working ends of the jaws together and thus effectually clamp the welding rod between the working faces of said jaws. Depending from the inner end of the actuating bar 22 is a keeper 30 which coacts with a sliding latch member 31. The latch member is in the form of a flat plate having a central opening 32 formed therein for the reception of the keeper, said latch being mounted for sliding movement transversely of the upper jaw and extending through suitable slots formed in the channel iron constituting said jaw. A spring 33 is operatively connected with the latch 31 and depending from the outer end of the latch is a push button 34 so that by pressing inwardly on the button 34, the latch will be moved transversely against the tension of the spring 33, thereby to release the keeper 30 and cause the spring 18 to separate the working ends of the jaws so that a welding rod may be removed therefrom or placed therein. It will thus be seen that the actuating member 22 is carried by the adjacent side plate 19 and when said side plate is depressed, the cam 29 will operate to clamp the jaws in engagement with a welding rod and, in which position, the side plate will be securely locked by means of the latch and keeper previously described.

Fitted over the work-engaging members 11 are channel-shaped caps 35 preferably formed of insulating material and fitted over said caps are correspondingly shaped metallic protecting shields 36 which serve to prevent the flame from coming in direct contact with the insulation and destroying the same, the parts being secured in position on the work-engaging members by screws or similar fastening devices 37.

It will thus be seen that by grasping the finger piece 28 and adjusting the bar 25 longitudinally of the jaw 10, the inclined fingers 26 of said bar will be forced beneath the nut 17 and thus permit adjustment of the jaw so as to accommodate welding rods of different thicknesses. After this adjustment has been effected, downward pressure is exerted on the side plate 19 which causes the keeper 30 to engage the latch 31 and lock the jaws in set position. In order to release the welding rod from the jaws, it is merely necessary to exert inward pressure on the button 34 which will release the actuating member 22 and cause the spring and the inherent resiliency of the jaws to separate the same and permit ready removal of the welding rod, as will be readily understood.

From the foregoing description it is thought that the construction and operation of the device will be readily understood by those skilled in the art and further description thereof is deemed unnecessary.

Having thus described the invention, what is claimed is:

1. An electrode holder comprising a handle, coacting resilient jaws carried by the handle and operatively connected with a source of electrical energy, a member extending between said jaws and carried thereby, means slidably mounted on one of said jaws for engaging one end of said member and adjusting said jaw toward and away from the mating jaw, and means mounted on the other end of said member for engaging said mating jaw and clamping both jaws in engagement with a welding rod.

2. An electrode holder comprising a handle, coacting jaws carried by the handle and operatively connected with a source of electrical energy a member loosely passing through and between said jaws, means movably mounted on one of said jaws for engaging one end of said member and adjusting said jaw toward and away from the mating jaw, means pivotally mounted on the other end of said member for acting upon the mating jaw and clamping both jaws in engagement with a welding rod after said adjustment has been effected, and means for releasing the clamping means to permit separation of the jaws.

3. An electrode holder comprising a handle, coacting jaws carried by the handle and operatively connected with a source of electrical energy, a spring interposed between said jaws, a pin passing through said jaws for limiting movement of the jaws away from each other, means mounted on one of said jaws for engaging an end of said pin and adjusting said jaw toward and away from the mating jaw, means mounted on the other end of the pin for acting upon the mating jaw and clamping said jaw against the tension of the spring in engagement with a welding rod, and a spring latch and keeper for holding said mating jaw in clamped position.

4. An electrode holder comprising a handle, coacting jaws channel-shaped in cross section carried by the handle and operatively connected with an electric cable, a member passing through and transversely between said jaws, means slidably mounted in the channel of one of the jaws for engaging said member and adjusting said jaw toward and away from the mating jaw, a spring interposed between said jaws and urging the jaws apart, means mounted in the channel of the mating jaw in pivotal engagement with said member for clamping the mating jaw against the tension of the spring in engagement with a welding rod, and means for holding the clamping means in a set position.

5. An electrode holder comprising a handle, coacting resilient jaws carried by the handle and operatively connected with a source of electrical energy, said jaws being channel-shaped in cross section and provided with grooved work-engaging faces, a pin loosely connected with both jaws near said work-engaging faces and provided with terminal enlarged portions, a bar slidably mounted in the channel of one of the jaws and provided with inclined fingers extending beneath the adjacent enlargement of the pin for clamping the work-engaging face of said jaw toward and away from the work-engaging face of the mating jaw, means for manually adjusting said bar, and an actuating member mounted in the channel of the mating jaw and engaging the other enlargement of the pin, said actuating bar being provided with a cam adapted to engage said mating jaw for clamping the jaw in engagement with a welding rod.

6. An electrode holder comprising a handle, coacting resilient jaws carried by the handle and operatively connected with an electric cable, said jaws being channel-shaped in cross section, a pin forming a loose connection between said jaws, insulating side plates for said jaws, means mounted in the channel of one of the jaws and engaging the adjacent end of the pin for adjusting said jaw toward and away from the mating jaw, an actuating bar fitting in the channel of said mating jaw and connected with the adjacent side plate, one end of said actuating bar being pivotally connected with the adjacent end of the pin and the other end thereof provided with a depending keeper, and a spring pressed latch slidably mounted in said mating jaw and movable into engagement with the keeper for holding said mating jaw in clamped position.

7. An electrode holder comprising a handle, coacting jaws carried by the handle and operatively connected with an electric cable, said jaws being channel-shaped in cross section, a pin forming a loose connection between said jaws and provided with oppositely disposed enlargements, a bar slidably mounted in the channel of one of the jaws and having its forward end bifurcated to form inclined fingers engageable beneath the adjacent enlargement of the pin, side plates secured to said jaws, one of said plates being slotted, a finger piece secured to said bar and extending through the slot in the adjacent side plate, an actuating bar pivotally connected with the other enlargement of the pin and secured to the adjacent side plate, said actuating bar being provided with a cam adapted to engage said mating jaw between the flanges of the channel thereof, a keeper depending from the inner end of said actuating bar, and a spring pressed latch mounted on said mating jaw and engaging the keeper.

8. An electrode holder comprising a hollow handle, a socket fitted within the handle and having its rear portion attached to an electric cable and its forward portion projected longitudinally beyond the handle to form an extension, coacting resilient jaws secured to said extension, said jaws being channel-shaped in cross section, a pin forming a loose connection between said jaws, means mounted in the channel of one of the jaws and engaging the adjacent end of the pin for adjusting said jaw toward and away from the mating jaw, and means mounted in the channel of the mating jaw and engaging said pin for clamping both jaws in engagement with a welding rod.

JOHN M. RADABAUGH.